US010942822B2

(12) United States Patent
Sadavarte et al.

(10) Patent No.: US 10,942,822 B2
(45) Date of Patent: Mar. 9, 2021

(54) CONSISTENCY GROUP RESTORATION FROM A SECONDARY SITE

(71) Applicant: Nutanix, Inc., San Jose, CA (US)

(72) Inventors: Mayur Vijay Sadavarte, Sunnyvale, CA (US); Vanita Prabhu, Bengaluru (IN); Bharat Kumar Beedu, Bangalore (IN); Monoreet Mutsuddi, San Jose, CA (US); Parthasarathy Ramachandran, Palo Alto, CA (US)

(73) Assignee: Nutanix, Inc., San Jose, CA (US)

( * ) Notice: Subject to any disclaimer, the term of this patent is extended or adjusted under 35 U.S.C. 154(b) by 73 days.

(21) Appl. No.: 16/201,258

(22) Filed: Nov. 27, 2018

(65) Prior Publication Data

US 2019/0163581 A1    May 30, 2019

Related U.S. Application Data

(60) Provisional application No. 62/591,123, filed on Nov. 27, 2017.

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 11/1464* (2013.01)

(58) Field of Classification Search
CPC .......... G06F 11/1451; G06F 11/1464; G06F 11/1469
See application file for complete search history.

(56) References Cited

U.S. PATENT DOCUMENTS

| 5,592,618 | A  | 1/1997  | Micka et al.     |
|-----------|----|---------|------------------|
| 6,493,796 | B1 | 12/2002 | Arnon et al.     |
| 7,136,974 | B2 | 11/2006 | Burton et al.    |
| 7,346,805 | B1 | 3/2008  | Scharland et al. |
| 7,467,266 | B2 | 12/2008 | Burton et al.    |
| 7,515,287 | B2 | 4/2009  | Kitada           |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Joshua P Lottich
(74) *Attorney, Agent, or Firm* — Vista IP Law Group, LLP

(57) ABSTRACT

Techniques for replay of groups of I/Os for disaster recovery. At a primary site, a plurality of primary site computing entities that are to be restored from the secondary computing site after a disaster recovery event are identified as belonging to an entity group. At the primary site, I/O commands that are performed over any of the entities of the entity group are observed and streamed to the secondary site, where they are persisted into a log. Periodically, the primary site sends the secondary site an I/O map that associates a time with an indication of the last performed I/O commands pertaining to any observed I/O commands that had been performed over any one or more of the computing entities of the entity group. Upon receiving a disaster recovery request, the most recent I/O map and the secondary site log are processed to construct a snapshot for the entity group.

24 Claims, 11 Drawing Sheets

(56) References Cited

U.S. PATENT DOCUMENTS

| | | |
|---|---|---|
| 7,519,628 B1 | 4/2009 | Leverett et al. |
| 7,574,418 B1 | 8/2009 | Patterson et al. |
| 7,725,671 B2 | 5/2010 | Prahlad et al. |
| 7,734,669 B2 | 6/2010 | Kottomtharayil et al. |
| 7,765,187 B2 | 7/2010 | Bergant et al. |
| 7,779,295 B1 | 8/2010 | Shah et al. |
| 7,840,533 B2 | 11/2010 | Prahlad et al. |
| 7,840,536 B1 | 11/2010 | Ahal et al. |
| 8,140,772 B1 | 3/2012 | Yang |
| 8,447,728 B2 | 5/2013 | Prahlad et al. |
| 8,549,518 B1 | 10/2013 | Aron et al. |
| 8,601,473 B1 | 12/2013 | Aron et al. |
| 8,762,335 B2 | 6/2014 | Prahlad et al. |
| 8,826,283 B2 | 9/2014 | Chen et al. |
| 8,850,130 B1 | 9/2014 | Aron et al. |
| 8,914,567 B2 | 12/2014 | Miroshnichenko et al. |
| 9,069,704 B2 | 6/2015 | Schreter et al. |
| 9,081,754 B1 | 7/2015 | Natanzon et al. |
| 9,223,659 B1 | 12/2015 | Natanzon et al. |
| 9,268,602 B2 | 2/2016 | Prahlad et al. |
| 9,311,242 B1 | 4/2016 | Banerjee |
| 9,405,481 B1 | 8/2016 | Cohen et al. |
| 9,626,212 B2 | 4/2017 | Beveridge et al. |
| 9,740,577 B1 | 8/2017 | Chakraborty et al. |
| 9,740,723 B2 | 8/2017 | Prahlad et al. |
| 9,772,866 B1 | 9/2017 | Aron et al. |
| 9,946,569 B1 | 4/2018 | Beedu et al. |
| 1,021,004 A1 | 2/2019 | Sancheti |
| 1,024,865 A1 | 4/2019 | Prahlad et al. |
| 10,255,137 B1* | 4/2019 | Panidis .............. G06F 11/1453 |
| 1,042,363 A1 | 9/2019 | Shemer et al. |
| 10,437,783 B1* | 10/2019 | Cohen ................. G06F 16/1748 |
| 10,484,179 B1* | 11/2019 | Natanzon .............. H04L 9/3239 |
| 10,545,682 B1* | 1/2020 | Dalal ..................... G06F 3/067 |
| 1,064,986 A1 | 5/2020 | Natanzon et al. |
| 2003/0051109 A1 | 3/2003 | Cochran |
| 2003/0072263 A1 | 4/2003 | Peterson |
| 2003/0191743 A1 | 10/2003 | Brodersen et al. |
| 2006/0047926 A1 | 3/2006 | Zheng |
| 2006/0053261 A1 | 3/2006 | Prahlad et al. |
| 2006/0075281 A1 | 4/2006 | Kimmel et al. |
| 2007/0185937 A1 | 8/2007 | Prahlad et al. |
| 2010/0107158 A1 | 4/2010 | Chen et al. |
| 2014/0115341 A1 | 4/2014 | Robertson |
| 2014/0279892 A1 | 9/2014 | Bourbonnais et al. |
| 2014/0317597 A1 | 10/2014 | Marks |
| 2016/0210195 A1 | 7/2016 | Sinha |
| 2016/0342334 A1 | 11/2016 | Elisha |
| 2016/0359955 A1 | 12/2016 | Gill et al. |
| 2017/0060449 A1 | 3/2017 | Zucca et al. |
| 2017/0131905 A1 | 5/2017 | Agombar et al. |
| 2017/0193012 A1 | 7/2017 | Gupta et al. |
| 2017/0262520 A1 | 9/2017 | Mitkar et al. |
| 2017/0315728 A1 | 11/2017 | Zheng et al. |
| 2018/0121453 A1 | 5/2018 | Jain et al. |
| 2018/0143880 A1 | 5/2018 | Dornemann |
| 2018/0276084 A1 | 9/2018 | Mitkar et al. |
| 2018/0285214 A1* | 10/2018 | Ashraf ................ G06F 11/1448 |
| 2019/0340075 A1* | 11/2019 | Ramachandran ... G06F 11/1451 |
| 2020/0097376 A1 | 3/2020 | Zhao et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Volume Shadow Copy Service. Docs.Microsoft.Com, 2019, https://docs.microsoft.com/en-us/previous-versions/windows/it-pro/windows-server-2008-R2-and-2008/ee923636(v=ws.10). Accessed Sep. 2, 2014.

Non-Final Office Action dated Aug. 6, 2020 for related U.S. Appl. No. 16/200,482.

Arrieta-Salinas, Itziar, et al., "Classic Replication Techniques on the Cloud", ARES 2012, Prague, Czech Republic, Aug. 20-24, 2012, pp. 268-273.

Yoon, Hobin, et al., "Attribute-Based Partial Gee-Replication System", IC2E 2016, Berlin, Germany, Apr. 4-6, 2016, pp. 127-130.

Non-Final Office Action dated Aug. 11, 2020 for U.S. Appl. No. 16/201,826.

Final Office Action dated Sep. 10, 2020 for related U.S. Appl. No. 16/200,470.

Non-Final Office Action dated Feb. 21, 2020 for related U.S. Appl. No. 16/200,470.

Cano, I. et al., "Curator: Self-Managing Storage for Enterprise Clusters", 14th USENIX Symposium on Networked Systems Design and Implementation, NSDI '17, (Mar. 27, 2017).

International Search Report dated Feb. 14, 2019 for corresponding PCT Patent Application No. PCT/US18/62669.

International Preliminary Report dated Jan. 6, 2020 for corresponding PCT Patent Application No. PCT/US18/62669.

Non-Final Office Action dated Mar. 19, 2020 for related U.S. Appl. No. 16/200,502.

VMWARE, "Using Storage vMotion to migrate a virtual machine with many disks timeout (1010045)", (Last Updated Feb. 19, 2014).

Final Office Action dated Sep. 29, 2020 for related U.S. Appl. No. 16/200,470.

Non-Final Office Action dated Jan. 6, 2021 for related U.S. Appl. No. 16/200,470.

Final Office Action dated Jan. 11, 2021 for U.S. Appl. No. 16/201,826.

Non-Final Office Action dated Jan. 26, 2021 for related U.S. Appl. No. 16/200,502.

* cited by examiner

CONSISTENCY GROUP RESTORATION FROM A SECONDARY SITE

RELATED APPLICATIONS

The present application claims the benefit of priority to U.S. Provisional Patent Application Ser. No. 62/591,123 titled "EMULATING HIGH-FREQUENCY SNAPSHOTS BY FORMING RESTORE POINT DATA SETS BASED ON REMOTE SITE REPLAY OF I/O COMMANDS", filed on Nov. 27, 2017, which is hereby incorporated by reference in its entirety.

FIELD

This disclosure relates to computer data backup and restore capabilities, and more particularly to techniques for emulating high-frequency snapshots by forming restore point data sets based on remote site replay of I/O commands.

BACKGROUND

Computer data is valuable, so valuable in fact that modern computer systems are often architected to support substantial recovery of computer data even in the event of some disaster. For example, a primary site might process computer records, say 10,000 transactions per day. On an ongoing basis, the transactions at the primary site are collected into "daily backup files" or "hourly snapshot files", and those "daily backup files" and/or "hourly snapshot files" are replicated at one or more sites that are geographically distant from the primary site. As such, even in the event of some sort of large scale disaster at the primary site, the "daily backup files" and/or the "hourly snapshot files" that were replicated to a geographically distant site can be used to recover the data up to the point in time of the last "daily backup file" or "hourly snapshot file" had been received at the secondary site.

As computer data becomes ever more valuable, a loss of one day's amount of data, or even a loss of one hour's amount of data can be extremely costly. Therefore, system administrators often schedule more and more frequent snapshots even though the processing and communication of more and more frequent snapshots incurs commensurately more and more expense.

Unfortunately, as the frequency of generating snapshots increases (e.g., to minimize the time period of lost data in the event of a disaster), the expense of doing so becomes exorbitant. Therefore, what is needed is a way to allow for up-to-date recovery without incurring the exorbitant expense.

SUMMARY

The present disclosure describes techniques used in systems, methods, and in computer program products for emulating high-frequency snapshots by forming restore point data sets based at least in part on remote site replay of certain I/O commands that are identified by a specially-configured, continually updated I/O map that relates streamed I/O commands to a time and grouping. Such techniques advance the relevant technologies to address technological issues with legacy approaches. More specifically, the present disclosure describes techniques used in systems, methods, and in computer program products for streaming I/O commands to a remote site for later formation of a restore point by using an I/O log and an I/O map for I/O replay.

The disclosed embodiments modify and improve over legacy approaches. In particular, the herein-disclosed techniques provide technical solutions that address the technical problems attendant to restoring data up to the most recent I/O commands without performing high-frequency snapshots. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of distributed storage systems as well as advances in various technical fields related to computing cluster management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figures 1A, 1B:
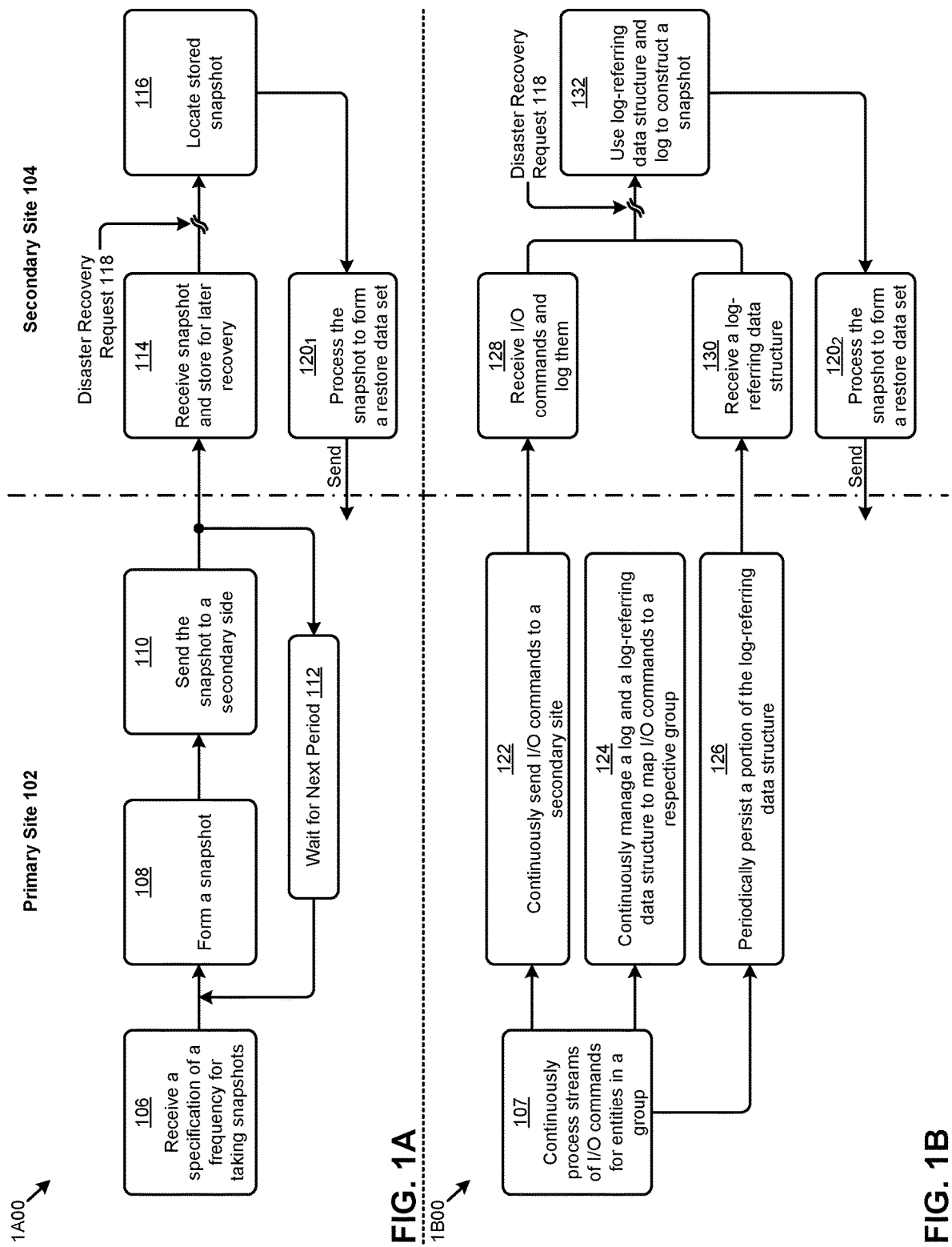
FIG. 1A is a block diagram depicting a disaster recovery technique that responds to a disaster recovery request by locating a previously-received snapshot.
FIG. 1B is a block diagram depicting a disaster recovery technique that responds to a disaster recovery request by constructing a snapshot from previously-received I/O commands, according to some embodiments.

Embodiments in accordance with the present disclosure address the problem of restoring data up to the most recent I/O (input/output or IO) commands without performing high-frequency snapshots. Embodiments of systems, methods, and computer program products emulate high-frequency snapshots by forming restore point data sets based at least in part on remote site replay of certain I/O commands that are identified by a specially-configured, continually updated I/O map that relates streamed I/Os to a time and grouping. Such techniques advance the relevant technologies to address technological issues with legacy approaches. More specifically, the present disclosure describes techniques used in systems, methods, and in computer program products for streaming I/O commands to a remote site for later formation of a restore point using an I/O log and an I/O map for I/O replay.

Overview

Computer data is valuable, so valuable in fact that modern computer systems are often architected to support substantial recovery of computer data even in the event of some disaster. For example, a primary site might process computer records, say 10,000 transactions per day. On an ongoing basis, the transactions at the primary site are collected into "daily backup files" or "hourly snapshot files", and those "daily backup files" and/or "hourly snapshot files" are replicated at one or more sites that are geographically distant from the primary site. As such, even in the event of some sort of large scale disaster at the primary site, the "daily backup files" and/or the "hourly snapshot files" that were replicated to a geographically distant site can be used to recover the data up to the point in time of the last "daily backup file" or "hourly snapshot file" had been received at the secondary site.

For example, each snapshot pertaining to a particular moment in time might comprise several hundred gigabytes of data, thus incurring several hundred gigabytes of storage on the primary site, as well as on the secondary site, each time a snapshot is generated. Plus, there is a latency involved in transmitting those several hundred gigabytes from one site to another. As the frequency of generating snapshots increases, at some point, the next snapshot is needed even before the previous snapshot has been fully received at the secondary site.

The techniques disclosed herein eliminate the need for constructing snapshots until there is a need to recover data (e.g., in the aftermath of some sort of large scale disaster). Instead, rather than constructing snapshots and sending them from a primary site to one or more secondary sites, raw I/O commands are continuously transmitted from the primary site to a secondary site as they occur. Such raw I/O commands are observed and logged on the primary site, then sent to a secondary site where they are also logged. A data structure that stores identifiers corresponding to entries in an I/O log is maintained on an ongoing basis as raw I/O commands are observed. Forms of such a log-referring data structure (e.g., an I/O map) are disclosed herein, any/all of which forms are very small (e.g., on the order of thousands or even millions of times smaller) relative to the data of the I/O commands to which the data structure refers. Formation and communication of the data structure (e.g., the I/O map) is correspondingly fast and inexpensive. As such, the data structure can be sent very frequently to a secondary site.

In the event that the secondary site is called on for disaster recovery operations, the secondary site will have extremely recent data (e.g., up to the last I/O that was successfully transmitted) as well as an extremely recent instance of the mapping data structure. The mapping data structure comprises sufficient information to "stitch together" a recovery set by replaying a certain set of "newer" I/O commands over an "older" backup set. The mapping data structure is populated with information such that multiple entities (e.g., multiple files, multiple disk drives, etc.) can be grouped and restored to a state that is consistent across the multiple entities of the group. For example, if a portion of a database is stored on one drive, and another portion of the same database is stored on a different drive, those two drives can be logically handled as a group such that they would be restored together as a group.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

The diagrams of FIG. 1A and FIG. 1B can be compared to discern the differences between the two techniques. FIG. 1A performs periodic snapshots; however, as the frequency of generating snapshots increases (e.g., so as to minimize the time period of lost data in the event of a disaster), so does the expense of doing so. As higher and higher frequencies of taking snapshots are demanded, the time available to form the snapshot at the originating site becomes shorter and shorter, until the time needed to form the snapshot at the originating site becomes longer than the time available, resulting in an intractable situation.

Even when the time needed to form the snapshot at the originating site is shorter than the time available to form it and write it to the remote site, high-frequency snapshotting is wasteful. For example, if a million order transactions are being processed per day, and if the frequency of the snapshots is specified (e.g., per a service level agreement (SLA)) to be once per minute then, on average, a snapshot containing 694 transactions would need to be formed and transmitted to a remote site every minute. In most real-life scenarios, disasters happen infrequently; thus, nearly all of the snapshots transmitted from the originating site to the remote site would be unused. Indeed, the exorbitant expense of generating high-frequency snapshots often has no payback.

Disclosed herein are techniques that achieve the benefits that could accrue as a result of taking high-frequency snapshots, but without incurring the cost of doing so. Specifically, using streaming I/O techniques and on-demand generation of snapshots (e.g., after a disaster event), much less network bandwidth is demanded as compared to the bandwidth that would be used and wasted had the high-frequency snapshots been generated.

The disclosed techniques defer producing a snapshot until the snapshot is actually needed for disaster recovery, and the disclosed deferred snapshotting techniques yield the benefits that could be garnered by forming and transmitting snapshots at high frequencies, however without the exorbitant costs. The following FIG. 1A and FIG. 1B are for comparison.

FIG. 1A is a block diagram depicting a disaster recovery technique 1A00 that responds to a disaster recovery request by locating a previously-received snapshot.

The embodiment shown in FIG. 1A commences at step 106, where a module at a primary site 102 receives a specification of a frequency of snapshots. The snapshot frequency might be explicitly provided, or it might be derived from another system specification such as a restore point objective (e.g., don't lose more than 500 transactions, even in the case of a disaster). The snapshot frequency can be converted to a period of time. A loop can be entered by a process at the primary site wherein during each iteration of the loop, a successively next snapshot is formed (step 108) and transmitted to the secondary site (step 110). The process waits for a period of time that corresponds to the specified frequency (i.e., wait for next period 112), and the loop is performed again.

Each time a snapshot is formed (step 108) and transmitted to the secondary site 104, the secondary site receives the snapshot (step 114) and stores it at the secondary site. As some moment in time, there might be a disaster at the originating site, such that the secondary site is call upon to aid in restoration of the originating site (or alternate tertiary site). Therefore, at some moment in time after the disaster has occurred, the secondary site 104 receives a disaster recovery request 118. The secondary site locates an applicable snapshot (step 116) and processes it (step $120_1$). A restore data set that includes the located snapshot is then sent to the originating site (or alternate tertiary site).

As earlier mentioned, this technique is very wasteful. An alternative is to emulate high-frequency snapshotting using an I/O command log, which technique is shown and discussed as pertains to FIG. 1B.

FIG. 1B is a block diagram depicting a disaster recovery technique 1B00 that responds to a disaster recovery request by constructing a snapshot from previously-received I/O commands. As an option, one or more variations of disaster recovery technique 1B00 or any aspect thereof may be implemented in the context of the architecture and functionality of the embodiments described herein. The disaster recovery technique 1B00 or any aspect thereof may be implemented in any environment.

The embodiment shown in FIG. 1B is merely one example. In this embodiment, rather than processing a snapshot based at least in part on a snapshot frequency, which might be explicitly provided or might be derived from a system specification such as a restore point objective, the disaster recovery technique 1B00 commences at step 107 by continuously processing streams of I/O commands for particular set of entities that are grouped such that they will be restored as a group, thereby achieving consistency across of all of the entities in that group. Such processing can include writing to a file or virtual disk, or writing to or otherwise updating any computing entity of the primary site.

Rather than forming and sending snapshots in a loop, thus incurring processing and communication costs, step 122 serves to continuously send I/O commands to a secondary site. The formation of a snapshot and/or any other data that might be needed to aid in a restore operation can thusly be deferred until such a time as formation of a snapshot is actually needed. This relieves the primary site of computing resource burdens pertaining to high-frequency snapshot processing. The secondary site can autonomously choose to wait for an indication to form a snapshot, or the secondary site can autonomously choose to prospectively form snapshots on its own schedule (e.g., in observance of idle periods, background task priorities, etc.). In some cases, the secondary site has sufficient available resources such that snapshots can be frequently generated, without impacting workloads on the primary site. In some cases, prospectively formed snapshots are stored as an incremental backup. The availability of prospectively generated snapshots and other prospectively built backup datasets means that a restore operation can be started and completed in a relatively short period of time; that is, a restore operation can be started and completed in much less time than if the alternative of replaying a long sequence of I/Os were performed to generate a snapshot.

In either case, restore operations can be initiated at the secondary site at will, and the secondary site can autonomously determine a mechanism for generating the restore set (e.g., to use snapshots or to replay I/Os or to use some combination of both). More specifically, to have the data needed for generating the restore set, the secondary site receives the I/O commands from the primary site and logs them (step 128). This sending and receiving of I/O commands in a stream is continuous and incurs relatively little incremental expense. Since the secondary site handles most activities pertaining to a disaster recovery, the primary site need not manage snapshot formation and communication of snapshots that the secondary site might not ever use.

However, to bring the secondary site to a state such that it has the data needed for a restore after a disaster, the primary site performs step 124 for managing population of an I/O log and step 126 manages ongoing updates to a log-referring data structure (e.g., an I/O map). The data structure maps I/O commands of the entities of a group so that a snapshot corresponding to the group can be generated at any moment in time. To be positioned to be able to generate a snapshot for any group of entities on command, steps are performed at the secondary site to persist the log as I/Os stream in (e.g., step 128) and to periodically update a log-referring data structure (e.g., step 130). At some moment in time, such as when a disaster recovery request 118 is received at the secondary site, step 132 replays I/O commands from the log based on the times and groupings given in the log-referring map. The resulting snapshot is then applied over data from earlier-persisted components of a restore set (e.g., at step $120_2$). The up-to-date restore set is then transmitted to the restore site.

Figure 2A:
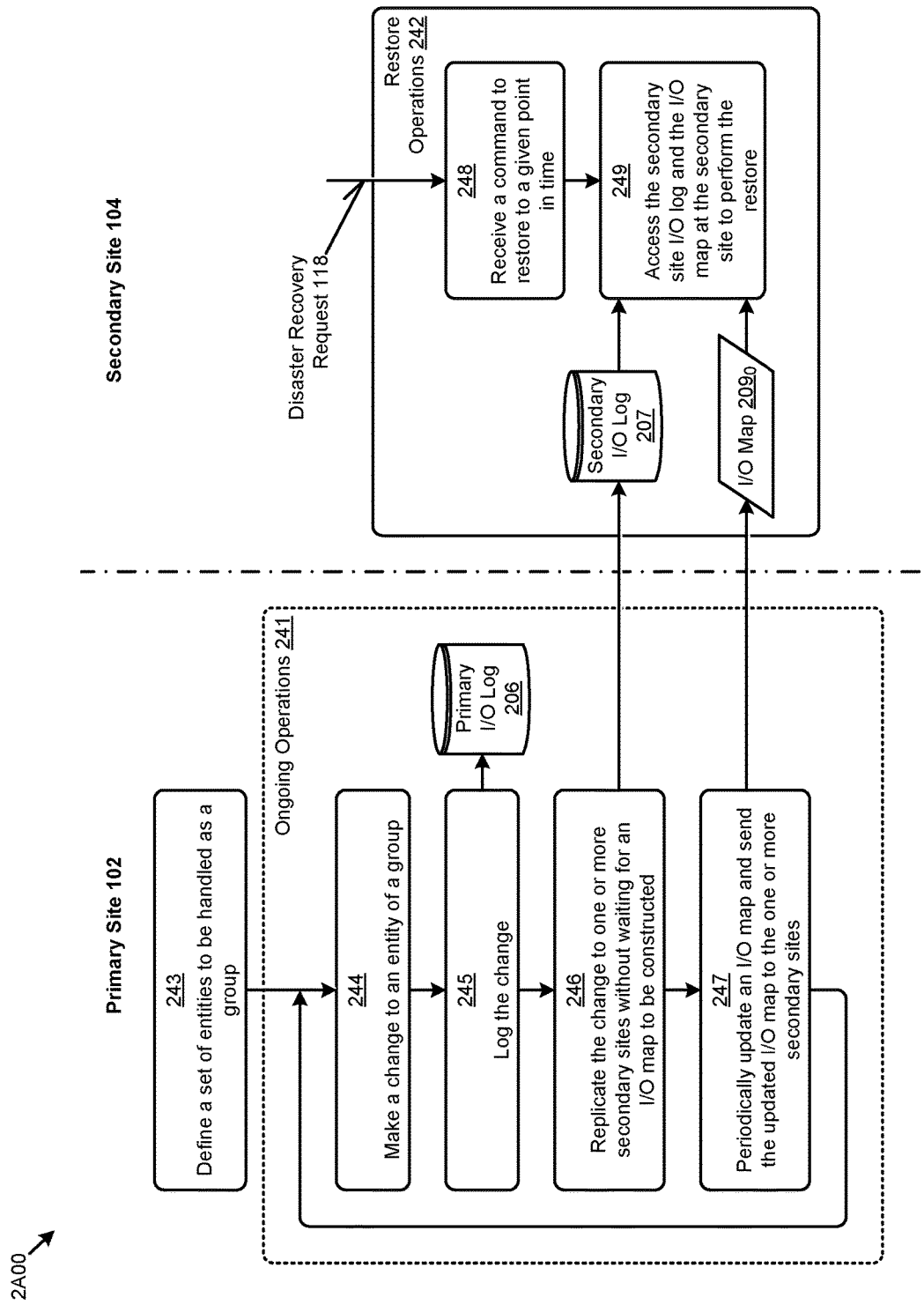
FIG. 2A is a block diagram that depicts a technique for streaming I/O commands to a remote site for deferred formation of a snapshot at that remote site, according to an embodiment.

FIG. 2A is a block diagram that depicts a technique 2A00 for streaming I/O commands to a remote site for deferred formation of a snapshot at that remote site. As an option, one or more variations of technique 2A00 or any aspect thereof may be implemented in the context of the architecture and functionality of the embodiments described herein. The technique 2A00 or any aspect thereof may be implemented in any environment.

The shown technique 2A00 commences by defining a set of entities to be handled as a group (step 243). In the context of the shown ongoing operations 241, various agents at the primary site make periodic changes to one or more of the entities of a group (step 244). The system detects the change and logs the occurrence (step 245) of the I/O command that precipitated the change in the log shown as primary I/O log 206. The I/O command that precipitated the change is also replicated at the secondary site (step 246). The replicated change is sent to the secondary site without waiting for an I/O map to be constructed. However, periodically, an I/O map is updated and sent to a secondary site (step 247).

During processing of the ongoing operations 241 at the primary site, the secondary site cooperates by storing the replicated I/O command into a secondary I/O log 207. Similarly, as the primary site forms and updates the I/O map, the contents of the I/O map are replicated at the secondary site in I/O map $209_0$.

When a disaster recovery request 118 is received at the secondary site, restore operations 242 are initiated. Operations of step 248 serve to identify a point in time from the received disaster recovery request. Specifically, step 248 processes the contents of the disaster recovery request to determine the time boundary (e.g., a particular recovery time indication) given in the disaster recovery request. In some cases, the disaster recovery request also comprises a specification of a group such that all of the constituent computing entities of that group are to be restored to the same point in time (e.g., to a particular specified recovery time). The restore operation continues at step 249, where a secondary site process accesses the secondary site I/O log and the I/O map $209_0$ to form a snapshot for the restore.

A variety of grouping regimes can be used with technique 2A00. Specifically, the shown step 243 that serves for defining a set of entities to be handled as a group can use any known technique for associating multiple computing entities into a group and then giving that group a name or other identifier that can be used as a tag or label. One such group identification technique is shown and described as pertains to FIG. 2B.

Figure 2B:
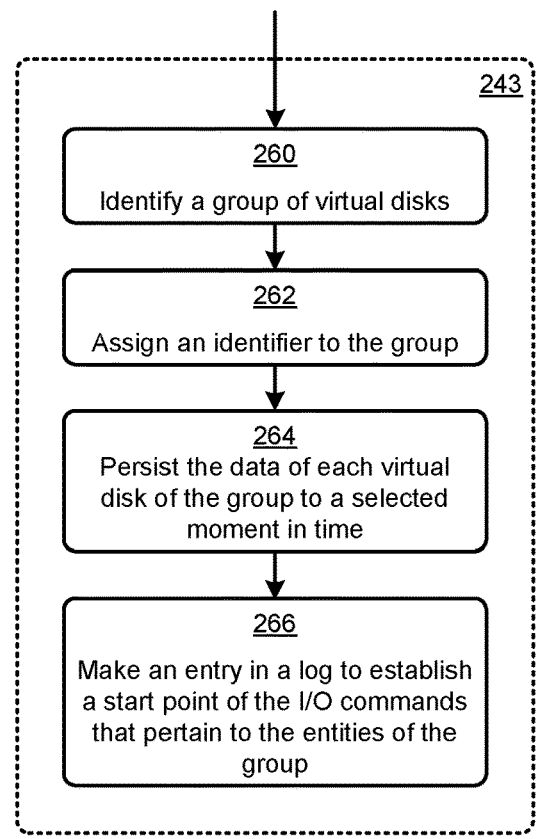
FIG. 2B is a block diagram that depicts a group identification technique used for associating I/O commands into a group for later formation of a snapshot for that group, according to some embodiments.

FIG. 2B is a block diagram that depicts a group identification technique 2B00 used for associating I/O commands into a group for later formation of a snapshot for that group. As an option, one or more variations of group identification technique 2B00 or any aspect thereof may be implemented in the context of the architecture and functionality of the embodiments described herein. The group identification technique 2B00 or any aspect thereof may be implemented in any environment.

In this embodiment, the step for defining a set of entities to be handled as a group (step 243) carries out operations to define a set of virtual disks (step 260), after which a name or identifier (step 262) is associated with the set virtual disks so as to have a name or handle for the set. The set of virtual disks might be brought into a set due to some logical interrelationship. For example, a set of two virtual disks might comprise data and its metadata that is organized into a first virtual disk to contain the data (e.g., a set of computer records) and a second virtual disk to contain the metadata (e.g., the addresses or other pointers to records that are in the data). In this case, both the data virtual disk and the metadata virtual disk should be persisted together so as to be consistent with each other.

Step 264 serves to persist the data of each virtual disk of the group to be consistent with each other up to a particular moment in time. In some cases, the particular moment in time might be specified by an administrator or agent. The group identification technique might further include steps to make an entry in a log (step 266) to establish a start point of the I/O commands of the group. In some embodiments, a log file is used in combination with an I/O map data structure for forming snapshots. A multi-site environment having a primary site and a secondary site, is shown and discussed as pertains to FIG. 3.

Figure 3:
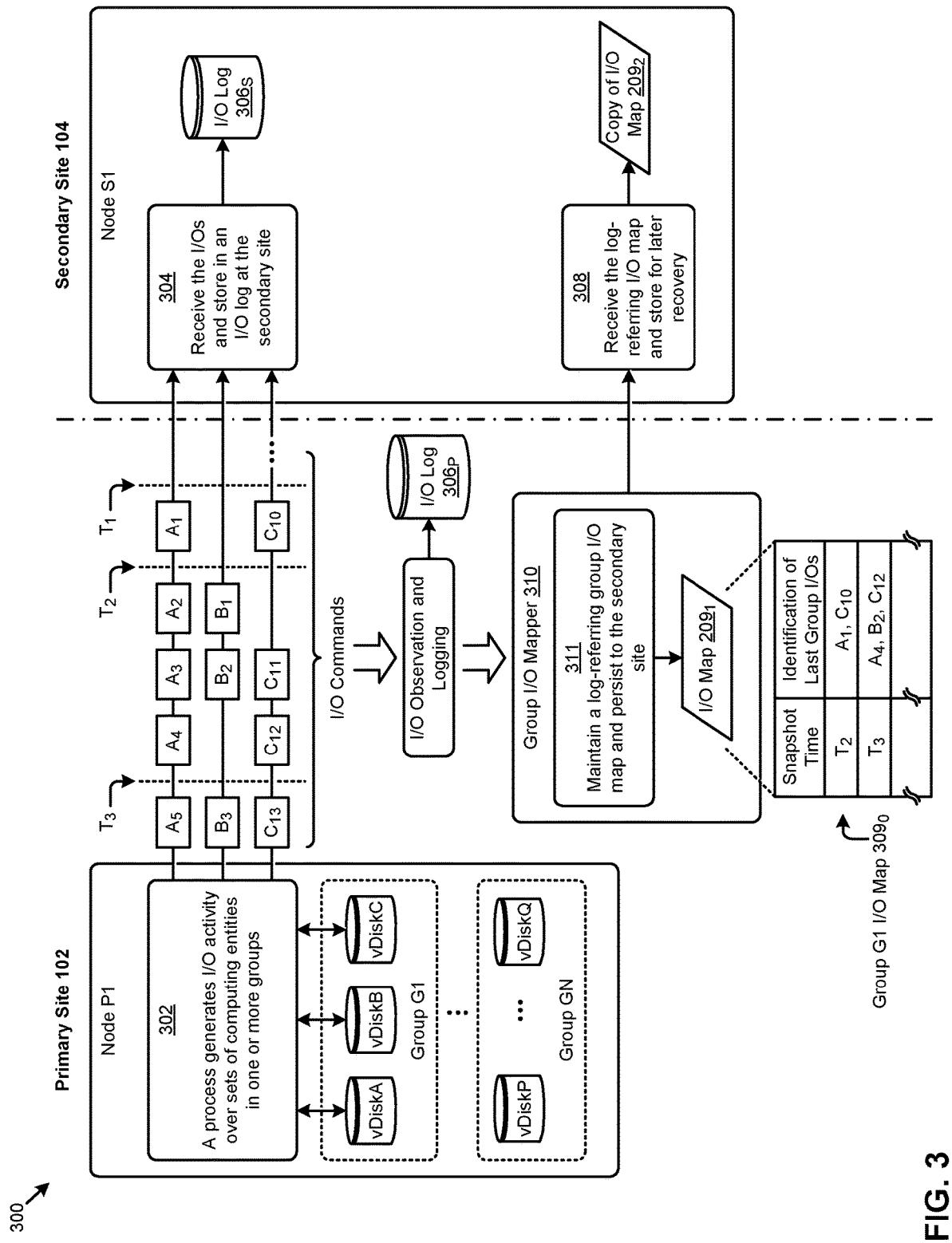
FIG. 3 depicts a multi-site environment in which steps for I/O command observation, I/O command logging, and I/O command mapping are combined to generate an I/O map that is used when forming a snapshot in response to a disaster recovery request, according to an embodiment.

FIG. 3 depicts a multi-site environment 300 in which steps for I/O command observation, I/O command logging, and I/O command mapping are combined to generate an I/O map that is used when forming a snapshot in response to a disaster recovery request. As an option, one or more variations of multi-site environment 300 or any aspect thereof may be implemented in the context of the architecture and functionality of the embodiments described herein.

As shown, primary site 102 includes one or more computing nodes, such as the shown "Node P1". Also as shown, secondary site 104 includes one or more computing nodes, such as the shown "Node S1". The primary site includes a process that generates I/O activity over sets of computing entities that have been drawn into one or more groups (step 302). As shown, "Group G1" comprises several virtual disks, namely "vDiskA", "vDiskB" and "vDiskC". Also, as shown "Group GN" comprises several virtual disks, namely "vDiskP", . . . , "vDiskQ". A group can comprise any combination of virtualized entities, including a vDisk or multiple vDisks, a virtual network interface card (vNIC) or multiple vNICs, a virtual machine configuration, etc.

Input/output activity over any of the computer entities in a group are streamed over from the primary site to the secondary site as a stream of I/O commands. More particularly, and as shown, while I/O commands are streamed from the primary site to the secondary site, the I/O commands are observed (e.g., using any known technique) and logged. For example, at some moment after time $T=T_1$, an I/O command "A1" as pertaining to vDiskA is observed, timestamped, and logged into an I/O playback repository (e.g., I/O log $306_P$).

On an ongoing basis, as I/O commands are streaming, a group I/O mapping process maintains an I/O map $209_1$.

In the specific embodiment of FIG. 3, the group I/O mapping process is performed by a group I/O mapper 310, which includes a processing capability (e.g., process 311) whereby a log-referring group I/O map is maintained as I/O commands are observed and logged. The I/O map is persisted periodically to the secondary site. More particularly, a node (e.g., Node S1) at the secondary site can receive I/O commands (process 304) and store them in an I/O playback repository (e.g., I/O log $306_S$). Also, a node at the secondary site can receive updates to the I/O map (process 308) and store such updated I/O mapping information in a persistent location, such as in the shown copy of I/O map $209_2$.

While I/O commands are being streamed to a secondary site, the I/O map is continuously being constructed. At various moments in time (e.g., the shown $T_1$, $T_2$, $T_3$), entries are made into the I/O map. For example, see the depiction of group G1 I/O map $309_0$. More specifically, and as shown, an individual entry into the I/O map comprises a time indication (e.g., the shown "Snapshot Time") and a last I/O indication (e.g., the shown "Identification of Last Group I/Os").

In this example, the last group I/Os pertaining to group G1 at the moment of time T=$T_2$ are "$A_1$" and "$C_{10}$". Also in this example, the last group I/Os pertaining to group G1 at the moment of time T=$T_3$ are "$A_4$", "$B_2$", and "$C_{12}$". The I/O map is continuously updated with whatever is the then-current last logged I/O command for an entity of a particular group.

There are many ways to form and continuously maintain an I/O map. One technique is shown and discussed as pertains to the following FIG. 4.

Figure 4:
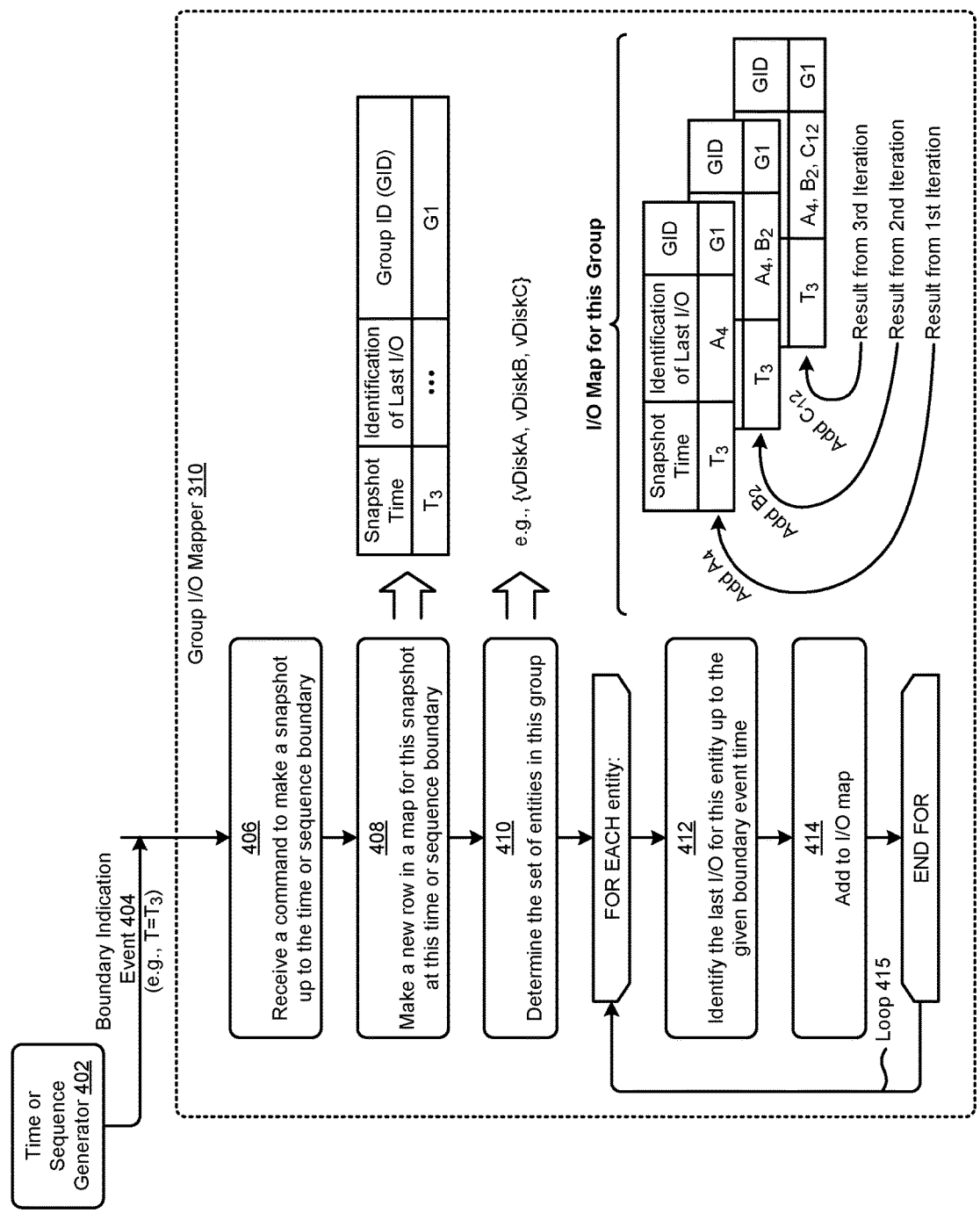
FIG. 4 presents a group I/O map maintenance technique for mapping streaming I/O commands into a group for later formation of a snapshot for that group, according to an embodiment.

FIG. 4 presents a group I/O map maintenance technique 400 for mapping streaming I/O commands into a group for later formation of a snapshot for that group. As an option, one or more variations of group I/O map maintenance technique 400 or any aspect thereof may be implemented in the context of the architecture and functionality of the embodiments described herein. The group I/O map maintenance technique 400 or any aspect thereof may be implemented in any environment.

The embodiment shown in FIG. 4 includes merely one example implementation of group I/O mapper 310. As shown, the group I/O mapper 310 is invoked by an occurrence of a boundary indication event 404. A boundary indication event might occur as a result of the passage of time to a next time unit (e.g., from an earlier time to time T=$T_3$), or a boundary indication event might be a progression through to a particular sequence number. In either of the foregoing cases, the boundary indication can be defined as a number that corresponds to a time progression or a sequence progression.

Accordingly, example embodiments include a time or sequence generator 402. The time or sequence generator can issue an instruction to the group I/O mapper, which instruction might be provided together with, or referred to by a boundary indication event 404. Step 406 interprets such a command in a manner to permit formation of an entry into the I/O map. More specifically, in the depicted embodiment, step 406 serves to make a new row in an I/O map. The I/O map might be a table or other mapping data structure that is specific to a particular group, such as is shown in FIG. 3, or the I/O map might be organized as a table or other mapping data structure that includes a column or label or other indication of the pertinence of a row to a group such as is shown in FIG. 4.

In the example shown in FIG. 4, the boundary indication received corresponds to time T=$T_3$. As such, when step 408 makes the new row, it includes a time or sequence indication, such as is shown in the column labeled "Snapshot Time". In this specific example, the time indication is T=$T_3$ and the group ID is "G1". Next, at step 410, a group definition data structure is accessed to determine the set of entities that are associated with the group "G1". In this example, group "G1" comprises vDiskA, vDiskB and vDiskC.

For each entity of the group, loop 415 is entered. Loop 415 iterates through each entity or group, identifying the last I/O command for the entity up until the specified boundary time or sequence is identified (step 412) and stored in a row (step 414). In this example, there are three entities in the group, thus, there are three iterations through loop 415. In each iteration, a different entity is handled, and the last I/O command for the entity up until the specified boundary time indication is identified and stored in a row. This is depicted in the diagram where the three iterations (e.g., result from 1st iteration, result from 2nd iteration, result from 3rd iteration) correspond to "Add $A_4$", "Add $B_2$", and "Add $C_{12}$", respectively.

As can be seen, when a row has been completed and the last I/O command, up until the specified time or sequence for each entity of the group has been entered into the I/O map for this group, the I/O map can then be used to replay entity-specific I/O commands up through the last I/O command, up until the specified time or sequence. As such, a snapshot can be generated on command. Snapshot generation is accomplished by identifying some previous backup data, then replaying I/O commands from the secondary I/O log 207 through to the last I/O command up until the specified time or sequence for this group.

The specific identification of a last I/O command can vary from implementation to implementation. In this example, the identification is given by pairing an entity identifier or abbreviation (e.g., "A", "B", "C", etc.) and a relative sequence number (e.g., 1, 2, 3, etc.). The specific identification of a given I/O command can be used to look up the entire contents of the logged I/O command. An example log is shown and described as pertains to FIG. 5.

Figure 5:
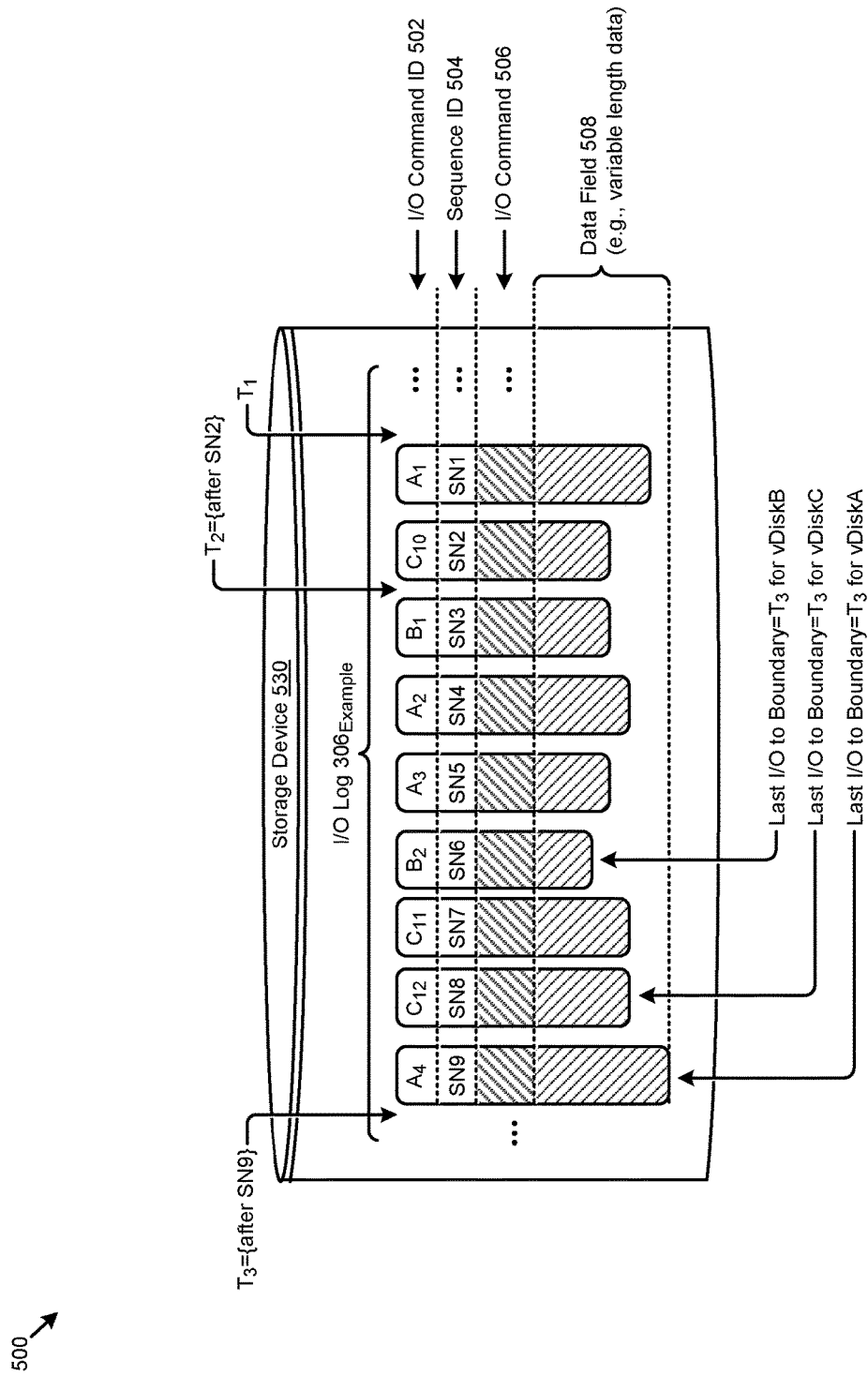
FIG. 5 depicts an example I/O log showing I/O commands for a particular entity group as used for formation of a snapshot from the I/O commands, according to some embodiments.

FIG. 5 depicts an example I/O log 500 showing I/O commands for a particular entity group as used for formation of a snapshot from the I/O commands. As an option, one or more variations of I/O log 500 or any aspect thereof may be implemented in the context of the architecture and functionality of the embodiments described herein. The I/O log 500 or any aspect thereof may be implemented in any environment.

The shown embodiment includes storage into a persistent storage device (e.g., storage device 530). The storage area is large enough to retain I/O commands over a long enough period of time so as to cover whatever snapshotting periods might be needed to observe a restore point objective. In this example, however, the shown storage area is merely large enough for illustration of this example. Specifically, the shown storage area of I/O log $306_{Example}$ holds nine I/O commands through time T=$T_3$, namely the I/Os identified as $A_1$, $C_{10}$, $B_1$, $A_2$, $A_3$, $B_2$, $C_{11}$, $C_{12}$ and $A_4$. In addition to I/O command ID 502, each I/O command entry also comprises a sequence ID 504 as well as the entire I/O command 506, including any data of the command. The data field 508 is of variable length. Strictly as an example, I/O command $A_1$ might be a command to "store these 5 blocks into vDiskA beginning at vDisk logical block ID=5005". As another example, I/O command $C_{10}$ might be a command to "store these 7 blocks into vDiskC beginning at vDisk logical block ID=6006".

When replaying I/O commands to form a restore set (e.g., after receiving a disaster recovery request), a replay process identifies some previous backup data, then replays I/O commands from the I/O log through to the last I/O command up until the specified time or sequence (such as time $T=T_3$). For example, and using $T=T_3$ as the time boundary, when replaying from the I/O log $306_{Example}$, I/O commands "$A_1$", "$A_2$", "$A_3$" and "$A_4$" (e.g., those I/O commands pertaining to vDiskA) are replayed over some previous backup set. Continuing this example, when replaying from the I/O log $306_{Example}$, I/O commands "$B_1$" and "$B_2$" (e.g., those I/O commands pertaining to vDiskB) are replayed over the previous backup set. Lastly, when replaying from the I/O log $306_{Example}$, I/O commands "$C_{10}$", "$C_{11}$" and "$C_{12}$" (e.g., those I/O commands pertaining to vDiskC) are replayed over the previous backup set. As such, the state of the computing entities of the group are available as a restore set, which can then be sent to the primary site for restoration.

Figure 6:
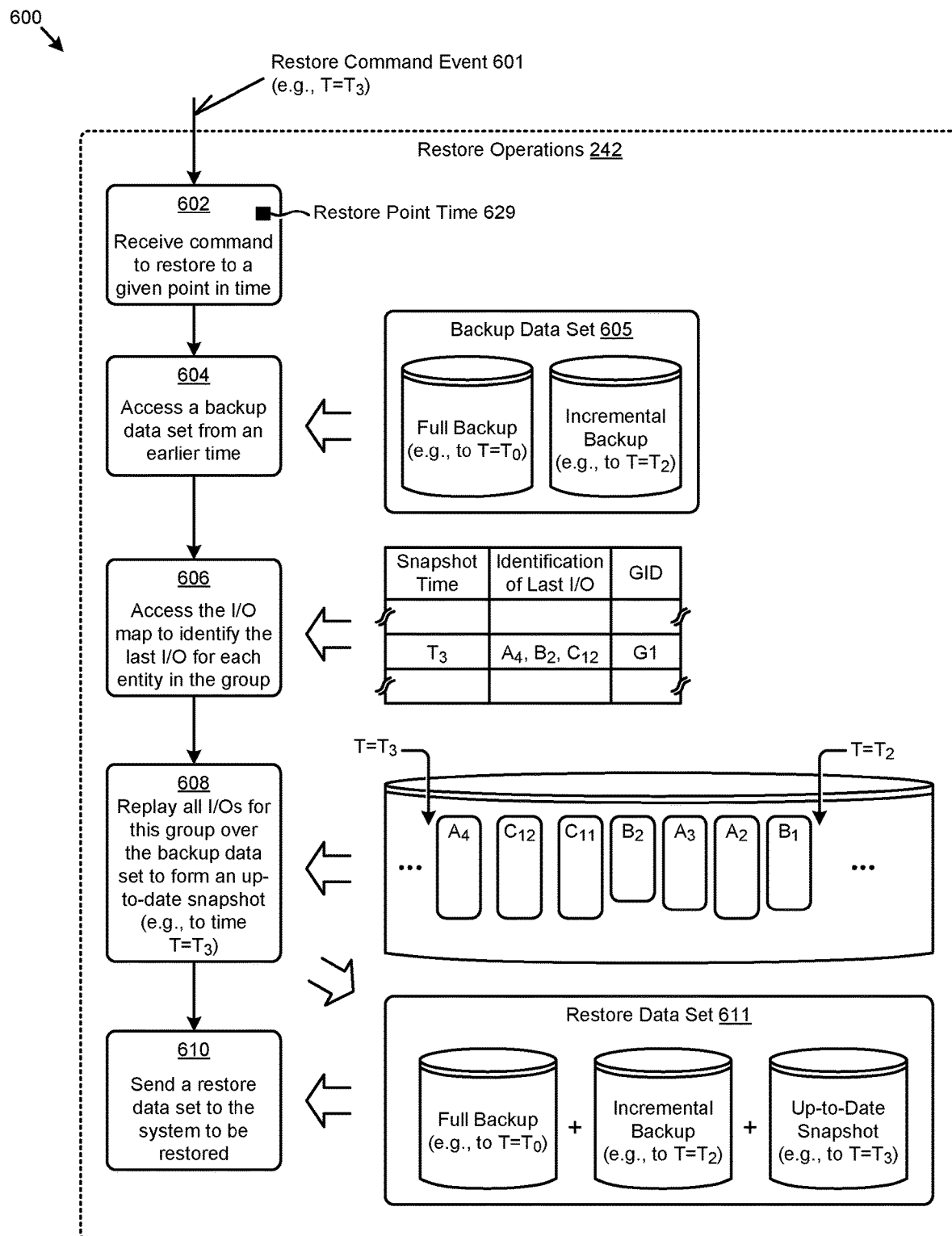
FIG. 6 depicts a restore set generation technique that uses an I/O map and an I/O log to replay I/O commands of a group to form an up-to-date snapshot for that group, according to some embodiments.

FIG. 6 depicts a restore set generation technique 600 that uses an I/O map and an I/O log to replay I/O commands of a group to form an up-to-date snapshot for that group. As an option, one or more variations of restore set generation technique 600 or any aspect thereof may be implemented in the context of the architecture and functionality of the embodiments described herein. The restore set generation technique 600 or any aspect thereof may be implemented in any environment.

The example restore operations 242 of FIG. 6 commence at step 602 upon receipt of a restore command event 601. A restore command might be included in a disaster recovery request and/or a restore command might be issued by a restore process or agent. As shown, the restore command event 601 includes a time (e.g., $T=T_3$) that requests restoration up to that point in time, such as is given by the shown restore point time 629. At step 604, an applicable backup data set 605 is accessed. The backup data set is used as a base set over which to replay I/O commands. In some cases, a backup data set might comprise a "Full Backup" (e.g., a full backup of data from a day ago or a few days ago) and an "Incremental Backup" (e.g., an incremental backup of data from an hour ago or a few hours ago).

When the applicable backup data set has been identified, then step 606 is entered. The operation of step 606 accesses the I/O map to identify the last I/O for each entity in the group. Step 608 replays the I/O commands from the point of the last time or sequence given in the backup set through to the last I/O identified by operations of step 606. This step 608 thus generates the restore data set 611, which is then made available to send to the primary site (or an alternate site) for restoration (step 610).

Additional Embodiments of the Disclosure

Additional Practical Application Examples

Figure 7:
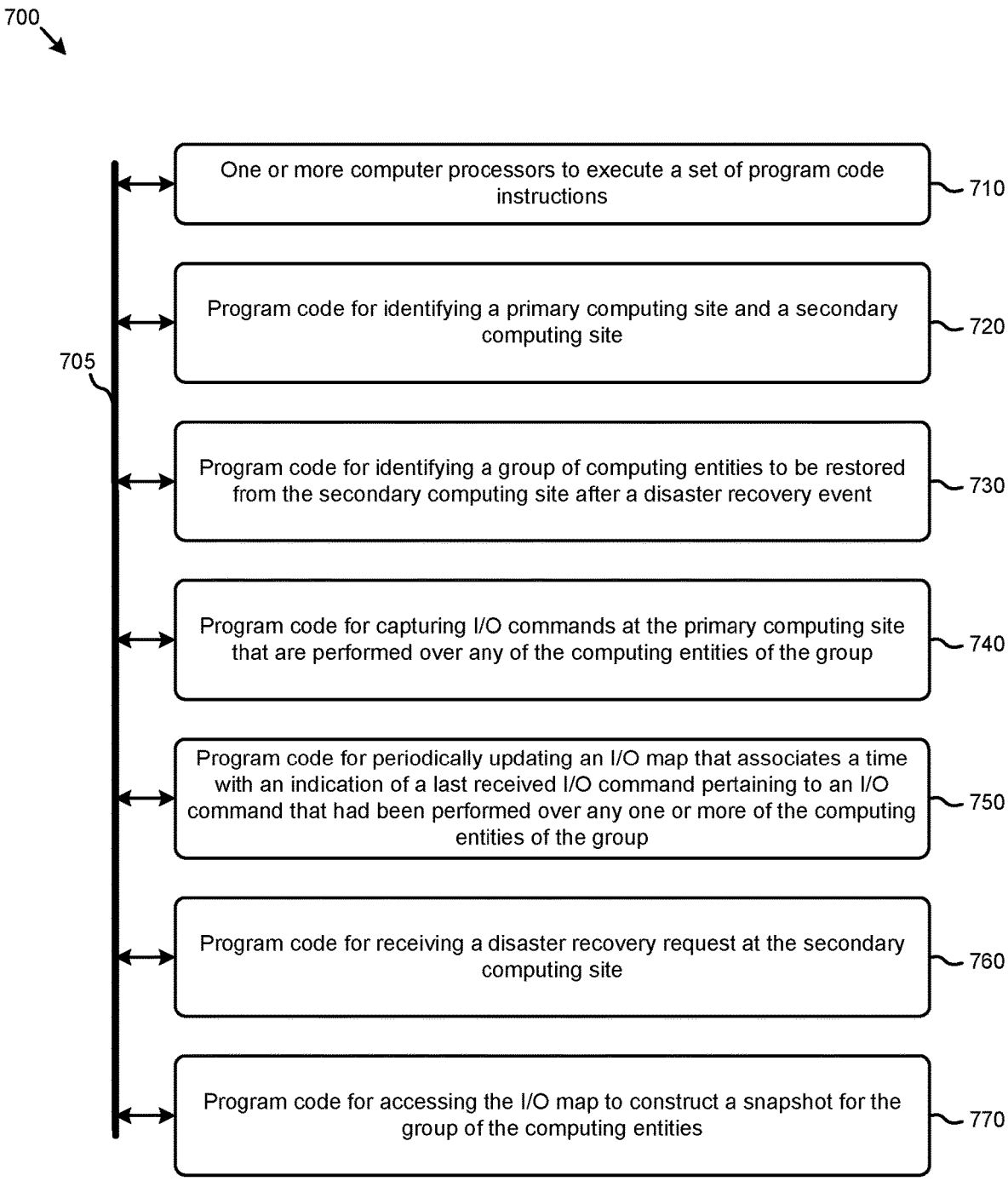
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address restoring data up to the most recent I/O commands without performing high-frequency snapshots. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: identifying a primary computing site and a secondary computing site (module 720); identifying a group of computing entities to be restored from the secondary computing site after a disaster recovery event (module 730); capturing I/O commands at the primary computing site that are performed over any of the computing entities of the group (module 740); periodically updating an I/O map that associates a time with an indication of a last received I/O command pertaining to an I/O command that had been performed over any one or more of the computing entities of the group (module 750); receiving a disaster recovery request at the secondary computing site (module 760); and accessing the I/O map to construct a snapshot for the group of the computing entities (module 770).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 8A:
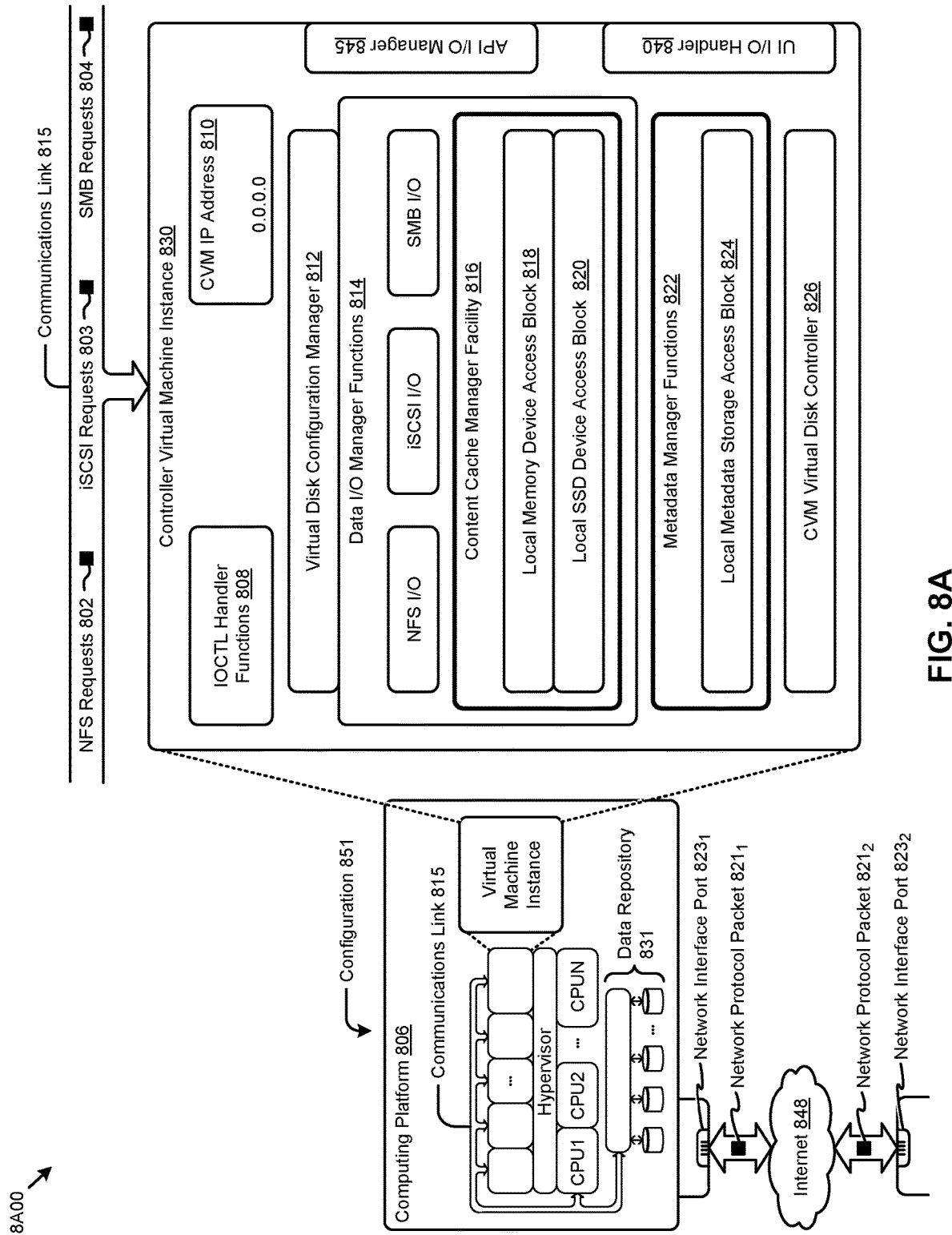
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to streaming I/O commands to a remote site for later formation of a restore point. In some embodiments, a module may include one or more state machines and/or combinational logic used to implement or facilitate the operational and/or performance characteristics pertaining to streaming I/O commands to a remote site for later formation of a restore point.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of streaming I/O commands to a remote site for later formation of a restore point). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to streaming I/O commands to a remote site for later formation of a restore point, and/or for improving the way data is manipulated when performing computerized operations pertaining to maintaining an I/O log and an I/O map for I/O replay.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
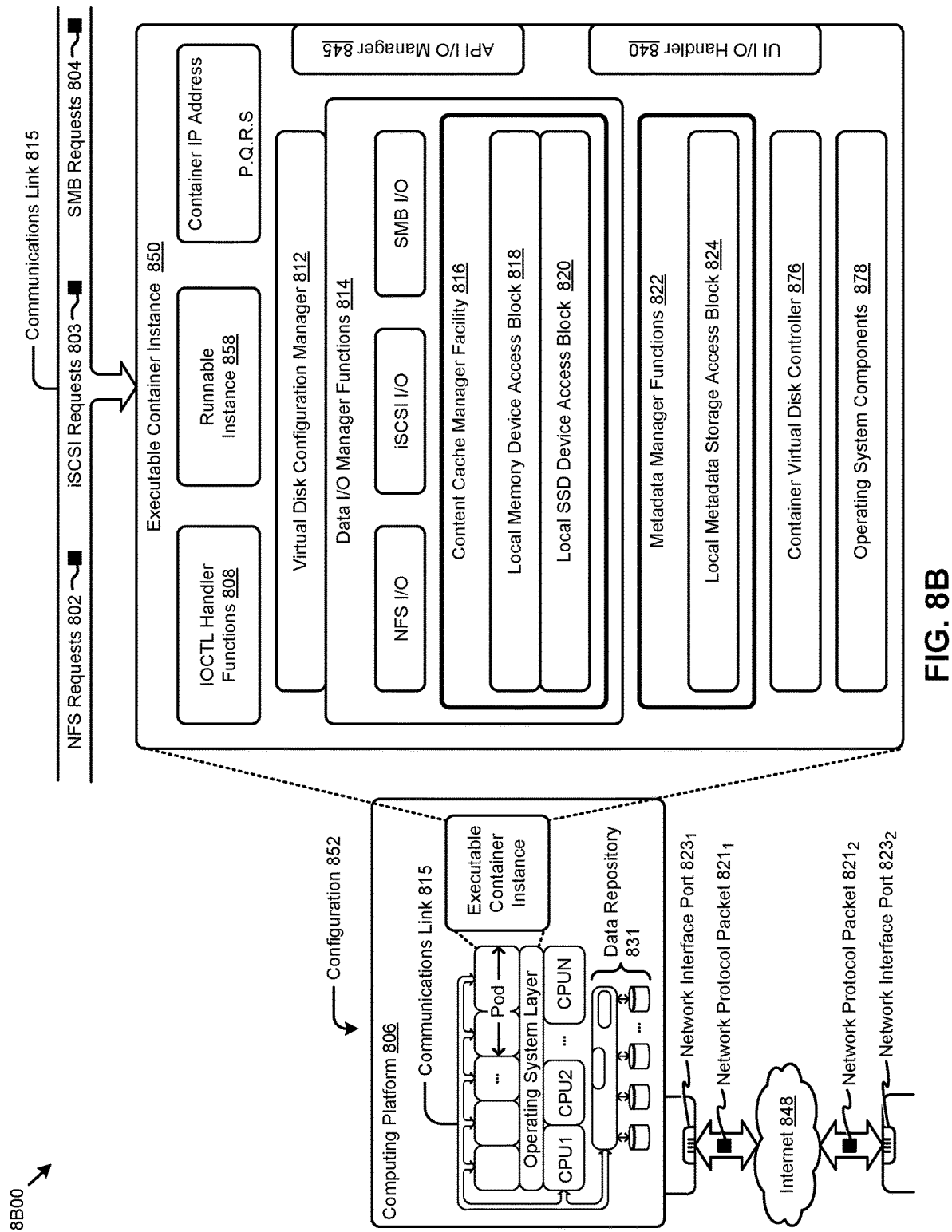

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
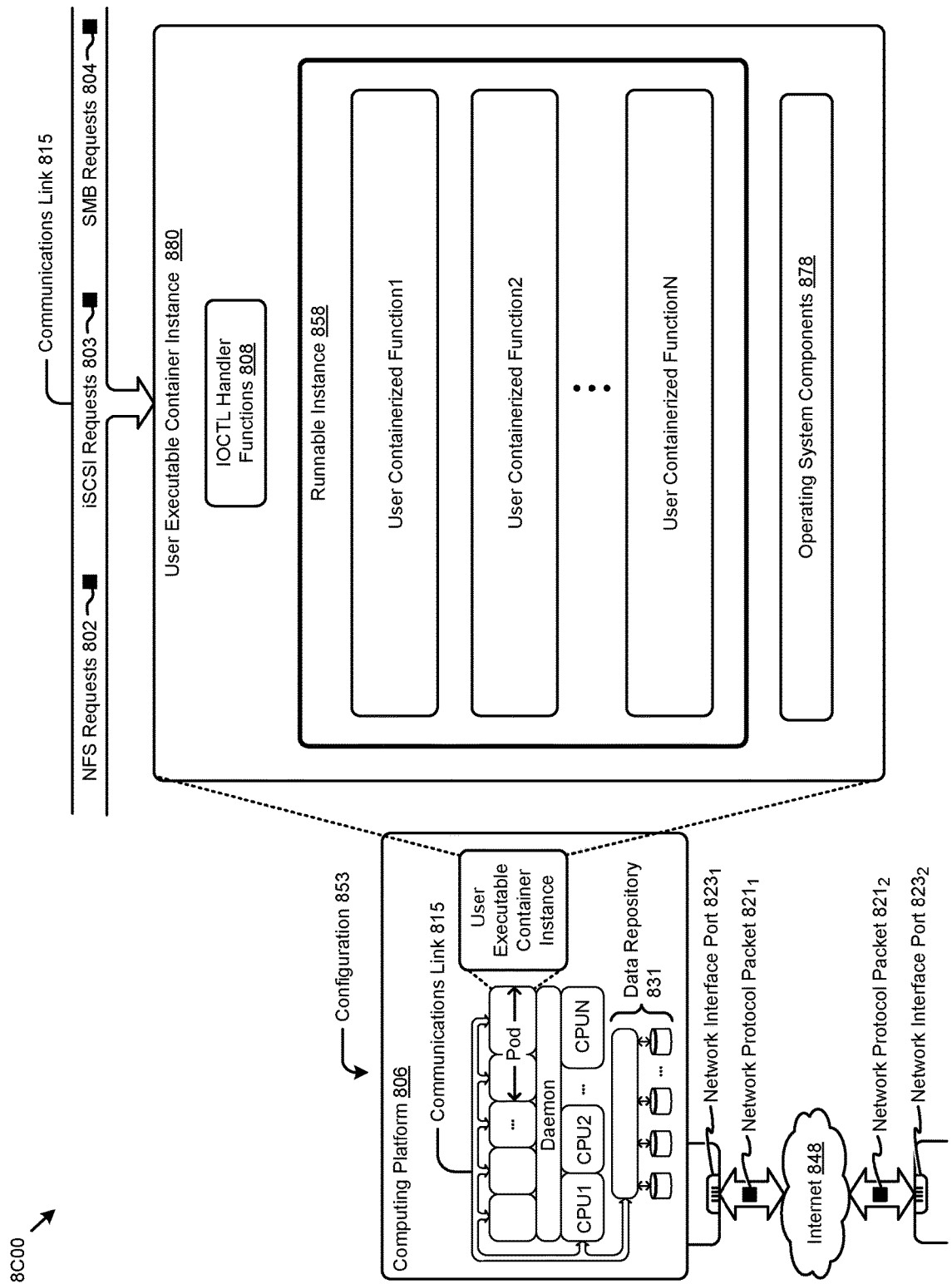

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown external data repository 831 and/or any forms of network accessible storage. As such, the multiple tiers of storage may include storage that is accessible over communications link 815. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine (CVM) is referred to as a "CVM", or as a controller executable container, or as a service virtual machine (SVM), or as a service executable container, or as a storage controller. In some embodiments, multiple storage controllers are hosted by multiple nodes. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
receiving I/O operations at a secondary computing site from a primary computing site, the I/O operations comprising copies of I/O operations that were performed over any computing entities of a group;
updating an I/O map that associates a time indication to a respective one of the copies of I/O operations, the time indication referring to when a corresponding I/O operation was performed over a computing entity of the computing entities;
receiving a recovery request at the secondary computing site; and
replaying at least some of the I/O operations by referring to the I/O map to identify a set of the copies of the I/O operations and performing the set of the copies of the I/O operations in an order of receipt.

2. The method of claim 1, wherein the replaying of the set of the I/O operations constructs a snapshot for the group of the computing entities.

3. The method of claim 1, wherein a snapshot for the group of the computing entities is replayed over a backup data set.

4. The method of claim 3, wherein the sets of the copies of the I/O operations that are replayed comprise at least the last received I/O command that was received into an I/O log at the secondary computing site.

5. The method of claim 1, wherein the computing entities of the group comprise at least one of, a vDisk, a virtual network interface card, virtual machine configuration, or a combination thereof.

6. The method of claim 1, wherein the secondary computing site forms snapshots at the secondary computing site without impacting workloads on the primary computing site.

7. The method of claim 1, wherein a snapshot formed at the secondary computing site is stored as an incremental backup and accessed after occurrence of the recovery request.

8. The method of claim 7, further comprising sending the snapshot for the group of the computing entities to the primary computing site, wherein the snapshot for the group of the computing entities comprises at least a portion of data from the incremental backup.

9. A non-transitory computer readable medium having stored thereon a sequence of instructions which, executed by a processor a set of acts, the set of acts comprising:
receiving I/O operations at a secondary computing site from a primary computing site, the I/O operations comprising copies of I/O operations that were performed over any computing entities of a group;
updating an I/O map that associates a time indication to a respective one of the copies of I/O operations, the time indication referring to when a corresponding I/O operation was performed over a computing entity of the computing entities;
receiving a recovery request at the secondary computing site; and
replaying at least some of the I/O operations by referring to the I/O map to identify a set of the copies of the I/O operations and performing the set of the copies of the I/O operations in an order of receipt.

10. The computer readable medium of claim 9, wherein the replaying of the set of the I/O operations constructs a snapshot for the group of the computing entities.

11. The computer readable medium of claim 9, wherein a snapshot for the group of the computing entities is replayed over a backup data set.

12. The computer readable medium of claim 11, wherein the sets of the copies of the I/O operations that are replayed comprise at least the last received I/O command that was received into an I/O log at the secondary computing site.

13. The computer readable medium of claim 9, wherein the computing entities of the group comprise at least one of, a vDisk, a virtual network interface card, virtual machine configuration, or a combination thereof.

14. The computer readable medium of claim 9, wherein the secondary computing site forms snapshots at the secondary computing site without impacting workloads on the primary computing site.

15. The computer readable medium of claim 9, wherein a snapshot formed at the secondary computing site is stored as an incremental backup and accessed after occurrence of the recovery request.

16. The computer readable medium of claim 15, wherein the set of acts further comprise: sending the snapshot for the group of the computing entities to the primary computing site, wherein the snapshot for the group of the computing entities comprises at least a portion of data from the incremental backup.

17. A system for constructing a snapshot to restore a group of computing entities, the system comprising:
a storage medium having stored thereon a sequence of instructions; and
a processor that executes the sequence of instructions to cause a set of acts, the set of acts comprising,
receiving I/O operations at a secondary computing site from a primary computing site, the I/O operations comprising copies of I/O operations that were performed over any computing entities of a group;
updating an I/O map that associates a time indication to a respective one of the copies of I/O operations, the time indication referring to when a corresponding I/O operation was performed over a computing entity of the computing entities;
receiving a recovery request at the secondary computing site; and
replaying at least some of the I/O operations by referring to the I/O map to identify a set of the copies of the I/O operations and performing the set of the copies of the I/O operations in an order of receipt.

18. The system of claim 17, wherein the replaying of the set of the I/O operations constructs a snapshot for the group of the computing entities.

19. The system of claim 17, wherein the snapshot for the group of the computing entities is replayed over a backup data set.

20. The system of claim 19, wherein the sets of the copies of the I/O operations that are replayed comprise at least the last received I/O command that was received into an I/O log at the secondary computing site.

21. The system of claim 19, wherein the computing entities of the group comprise at least one of, a vDisk, a virtual network interface card, virtual machine configuration, or a combination thereof.

22. The system of claim 19, wherein the secondary computing site forms snapshots at the secondary computing site without impacting workloads on the primary computing site.

23. The system of claim 19, wherein a snapshot formed at the secondary computing site is stored as an incremental backup and accessed after occurrence of the recovery request.

24. The system of claim 23, wherein the set of acts further comprise: sending the snapshot for the group of the computing entities to the primary computing site, wherein the snapshot for the group of the computing entities comprises at least a portion of data from the incremental backup.

* * * * *